(12) United States Patent
Ishii et al.

(10) Patent No.: US 10,625,678 B2
(45) Date of Patent: Apr. 21, 2020

(54) IMAGE DISPLAY DEVICE

(71) Applicant: TOYOTA JIDOSHA KABUSHIKI KAISHA, Toyota-shi (JP)

(72) Inventors: Takahiro Ishii, Toyota (JP); Satoshi Fujisaki, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/817,533

(22) Filed: Nov. 20, 2017

(65) Prior Publication Data

US 2018/0170264 A1    Jun. 21, 2018

(30) Foreign Application Priority Data

Dec. 20, 2016    (JP) .................................. 2016-247026

(51) Int. Cl.
| | |
|---|---|
| *B60R 1/12* | (2006.01) |
| *B60R 1/00* | (2006.01) |
| *G06T 11/60* | (2006.01) |
| *G06K 9/00* | (2006.01) |
| *B60R 1/04* | (2006.01) |

(52) U.S. Cl.
CPC .................. *B60R 1/12* (2013.01); *B60R 1/00* (2013.01); *B60R 1/04* (2013.01); *G06K 9/00791* (2013.01); *G06T 11/60* (2013.01); *B60R 2001/1253* (2013.01); *B60R 2300/30* (2013.01); *B60R 2300/303* (2013.01); *B60R 2300/605* (2013.01); *B60R 2300/8046* (2013.01); *B60R 2300/8066* (2013.01)

(58) Field of Classification Search
CPC ....................................................... B60R 1/12
See application file for complete search history.

(56) References Cited

U.S. PATENT DOCUMENTS

| 10,239,456 B1 * | 3/2019 | Tao ......................... B60R 1/081 |
| 2002/0167589 A1 * | 11/2002 | Schofield ............... B60N 2/002 |
| | | 348/148 |

(Continued)

FOREIGN PATENT DOCUMENTS

| JP | 2002-369186 A | 12/2002 |
| JP | 2009-23565 A | 2/2009 |

(Continued)

OTHER PUBLICATIONS

U.S. Office Action issued in U.S. Appl. No. 15/837,277 dated Dec. 6, 2019.

*Primary Examiner* — Jitesh Patel
(74) *Attorney, Agent, or Firm* — Oblon, McClelland, Maier & Neustadt, L.L.P.

(57) ABSTRACT

An image display device includes: a camera mounted on a vehicle and configured to take an image representing a view behind the vehicle; an image cutouter configured to cut out a second image as a cutout image that is cut out from a first image based on a cutout position representing a position of a portion of the first image in the first image, the first image being taken by the camera; and a display configured to display the second image cut out by the image cutouter. The image cutouter is configured to change the cutout position for the second image in the first image based on a change of an orientation of the vehicle.

10 Claims, 10 Drawing Sheets

(56) References Cited

U.S. PATENT DOCUMENTS

| | | | |
|---|---|---|---|
| 2004/0016870 A1* | 1/2004 | Pawlicki | B60W 30/18 |
| | | | 250/208.1 |
| 2005/0083427 A1 | 4/2005 | Imoto | |
| 2008/0195285 A1* | 8/2008 | Shimizu | B60R 1/00 |
| | | | 701/45 |
| 2010/0134264 A1* | 6/2010 | Nagamine | B60Q 9/005 |
| | | | 340/435 |
| 2010/0201816 A1* | 8/2010 | Lee | B60R 1/12 |
| | | | 348/148 |
| 2012/0154591 A1* | 6/2012 | Baur | B60R 1/00 |
| | | | 348/148 |
| 2013/0342658 A1* | 12/2013 | Kuhn | G06T 5/50 |
| | | | 348/47 |
| 2014/0347489 A1* | 11/2014 | Kumon | B60R 1/00 |
| | | | 348/148 |
| 2015/0294160 A1 | 10/2015 | Takahashi et al. | |
| 2016/0263997 A1* | 9/2016 | Mizutani | B60R 1/00 |
| 2016/0314358 A1* | 10/2016 | Kushida | G06K 9/00798 |
| 2017/0021770 A1 | 1/2017 | Arai et al. | |
| 2017/0162042 A1* | 6/2017 | Dooley | G08G 1/167 |
| 2017/0163863 A1* | 6/2017 | Gomez Timoneda | B60R 1/00 |

FOREIGN PATENT DOCUMENTS

| | | |
|---|---|---|
| JP | 2010-6129 A | 1/2010 |
| JP | 2013-60128 A | 4/2013 |
| JP | 5938703 B2 | 6/2016 |

* cited by examiner

LEFT ←⎯⎯→ RIGHT

RIGHT ←⎯⎯→ LEFT

LEFT ←→ RIGHT

LEFT ← → RIGHT ent. The inventions may be hereinafter referred to as "claimable inventions" and include at least the invention as defined in the appended claims. However, the inventions may further include an invention of a concept subordinate or superordinate to the concept of the invention defined in the appended claims, and/or an invention of a concept different from the concept of the invention defined in the appended claims. The forms are numbered like the appended claims and depend from another form or forms, where appropriate, for easy understanding of the invention. It is to be understood that combinations of features of the claimable inventions are not limited to those of the following forms. That is, the claimable inventions are to be construed by taking account of, e.g., the description following each form, the description of the embodiment, and conventional techniques, and as long as the claimable inventions are constructed in this way, any one of the following forms may be implemented with one or more features added, or one or more of a plurality of features included in any one of the following forms are not necessarily provided all together.

(1) An image display device, comprising: a camera mounted on a vehicle and configured to take an image representing a view behind the vehicle; an image cutouter configured to cut out a second image as a cutout image that is cut out from a first image based on a cutout position representing a position of a portion of the first image in the first image, the first image being taken by the camera; and a display configured to display the second image cut out by the image cutouter. The image cutouter is configured to change the cutout position for the second image in the first image based on a change of an orientation of the vehicle.

In response to a change of the orientation of the vehicle, a display object such as a following vehicle in the first image moves in the first image. In the present image display device, the cutout position is changed based on the change of the orientation of the vehicle. This change enables the display object having moved in the first image to be placed in the cutout image. This makes it possible to reduce movement of the display object, due to the change of the orientation of the vehicle, in the second image displayed in the display.

(2) The image display device according to the above form (1), wherein the image cutouter is configured to change the cutout position for the second image in the first image when the orientation of the vehicle is changed due to driving of the vehicle on a curve.

When the vehicle is driving on the curve, the orientation of the vehicle changes, and the camera takes an image representing an outer side of the curve than before the change of the orientation of the vehicle. In the present image display device, the cutout position is changed during driving on the curve, thereby reducing movement of the display object in the second image during driving on the curve.

(3) The image display device according to the above form (2), wherein the image cutouter is configured to change the cutout position for the second image in the first image such that the cutout position is moved toward an inner side of the curve in the first image, when driving of the vehicle on the curve is detected.

When the vehicle is driving on the curve, the orientation of the vehicle changes, and the camera takes an image representing an outer side of the curve than before the change of the orientation of the vehicle. In the present image display device, the cutout position is moved toward an inner side of the curve in the first image, enabling the display to display the curve behind the vehicle. Accordingly, even

IMAGE DISPLAY DEVICE

CROSS REFERENCE TO RELATED APPLICATION

The present application claims priority from Japanese Patent Application No. 2016-247026, which was filed on Dec. 20, 2016, the disclosure of which is herein incorporated by reference in its entirety.

BACKGROUND

The following disclosure relates to an image display device including a display mounted in a passenger compartment, configured to take an image representing a view behind a vehicle, and control the display to display the image representing the view behind the vehicle.

There is known an image display device including a display mounted in a passenger compartment at a position at which a rear-view mirror is mounted, and configured to control the display to display an image that is taken by a camera and represents a view behind the vehicle. Patent Document 1 (Japanese Patent No. 5938703) discloses an image display device configured to: cut out a cutout image which is a portion of an image taken by a camera; display the cutout image on a display; and change a position (a cutout position), at which the cutout image is cut out from the taken image, in accordance with a driver's operation of changing the angle of the display.

SUMMARY

In the above-described image display device, the camera is installed so as to take an image representing a view right behind the own vehicle. Thus, when an orientation (a direction of movement) of the vehicle is changed by, e.g., driving of the vehicle on a curve, a following vehicle and a lane behind the own vehicle in some cases disappear from the display.

Accordingly, an aspect of the disclosure relates to an image display device configured to change a cutout position for a cutout image in a taken image based on a change of an orientation of a vehicle.

In one aspect of the disclosure, an image display device includes: a camera mounted on a vehicle and configured to take an image representing a view behind the vehicle; an image cutouter configured to cut out a second image as a cutout image that is cut out from a first image based on a cutout position representing a position of a portion of the first image in the first image, the first image being taken by the camera; and a display configured to display the second image cut out by the image cutouter. The image cutouter being configured to change the cutout position for the second image in the first image based on a change of an orientation of the vehicle.

EFFECTS

The cutout position for the cutout image in the taken image is changed based on the detected change of the orientation of the vehicle, whereby the change of the orientation of the vehicle reduces movement of a display object in the second image displayed on the display.

CLAIMABLE INVENTIONS

There will be described by way of examples forms of inventions recognized to be claimable by the present appliwhen the orientation of the vehicle is changed during driving of the vehicle on the curve, the display displays the curve located behind the vehicle.

(4) The image display device according to any one of the above forms (1) through (3), wherein the image cutouter is configured to change the cutout position for the second image in the first image based on a first change amount that is an amount of change of the orientation of the vehicle in a first period.

The display object moved by a greater amount in the first image when the amount of change of the orientation of the vehicle is large than when the amount of change of the orientation of the vehicle is small. In the present image display device, the image cutouter may increase an amount of change of the cutout position when the first change amount is large and may reduce the amount of change of the cutout position when the first change amount is small.

(5) The image display device according to the above form (4), wherein the image cutouter is configured to: calculate the first change amount; and change the cutout position for the second image in the first image such that the cutout image created when the amount of change of the orientation of the vehicle in the first period is the first change amount becomes the cutout image created when the amount of change of the orientation of the vehicle is equal to a second change amount that is less than the first change amount.

An amount of change of a position of the display object in the first image due to change of the orientation of the vehicle depends on the magnitude of the amount of change of the orientation of the vehicle. That is, an amount of movement of the display object in the first image increases with increase in the amount of change of the orientation of the vehicle. For example, when the amount of change of the orientation of the vehicle is the second change amount that is less than the first change amount, the display object located in the cutout image in the first image at a time before the change of the orientation of the vehicle moves in the cutout image. When the amount of change of the orientation of the vehicle is the first change amount, in contrast, the amount of change of the orientation of the vehicle is greater than the second change amount, and accordingly the display object located in the cutout image in the first image at a time before the change of the orientation of the vehicle may move to an outside of the cutout image. In this case, in the present image display device, the cutout position is changed such that the cutout image in the case where the amount of change of the orientation of the vehicle is the first change amount becomes the cutout image in the case where the amount of change of the orientation of the vehicle is the second change amount. This processing enables the display to display the display object even when the amount of change of the orientation of the vehicle is the first change amount.

(6) The image display device according to the above form (5), wherein the image cutouter is configured to change the cutout position from a reference cutout position based on a change of the orientation of the vehicle, and the reference cutout position is a reference position for the cutout image in the first image, wherein the first period is a period whose endpoint is a first time point and whose starting point is a second time point that is earlier than the first time point, and wherein the image cutouter is configured to change the cutout position for the second image in the first image such that the second image cut out from the first image at the first time point becomes the cutout image cut out at the reference cutout position that is a position at a time before a change of the cutout position for the second image in the first image at the second time point.

The orientation of the vehicle at the first time point has changed with respect to the orientation of the vehicle at the second time point. This may cause a situation in which the display object located in the cutout image located at the reference cutout position in the first image at the second time point is moved by the change of the orientation of the vehicle in the first period, and the display object in the first image at the first time point is located at a position outer than the cutout position located at the reference cutout position. In the present image display device, the cutout image located at the cutout position for the second image in the first image at the first time point becomes the cutout image located at the reference cutout position in the first image at the second time point. Thus, the display object contained in the cutout image located at the reference cutout position in the first image at the second time point is also contained in the cutout image located at the cutout position in the first image at the first time point. This reduces occurrences of a situation in which the display object is not displayed on the display at the first time point.

(7) The image display device according to any one of the above forms (1) through (6), wherein the image cutouter is configured to change the cutout position for the second image in the first image when a following vehicle follows the vehicle and when a change of a position of the following vehicle in the first image is caused by a change of the orientation of the vehicle.

When the position of the following vehicle in the first image has changed due to the change of the orientation of the vehicle, there is a correlation between an amount of change of the position of the following vehicle in the first image and the amount of change of the orientation of the vehicle. In the present image display device, the cutout position is changed when the position of the following vehicle in the first image has changed due to the change of the orientation of the vehicle, thereby reducing change of the position of the following vehicle in the second image due to the change of the orientation of the vehicle.

(8) The image display device according to the above form (7), wherein the image cutouter is configured to: detect a first change amount and a position change amount, the first change amount being an amount of change of the orientation of the vehicle in the first period, the position change amount being an amount of change of the position of the following vehicle in the first image in the first period; and compare the first change amount and the position change amount with each other to determine whether the change of the position of the following vehicle by the position change amount in the first period is caused by a change of the orientation of the vehicle in the first period.

In the configuration described above, the image cutouter compares the first change amount and the position change amount with each other and determines, based on whether the first change amount and the position change amount correspond to each other based on a correlation, whether the change of the position of the following vehicle by the position change amount is caused by the change of the orientation of the vehicle in the first period.

(9) The image display device according to the above form (8), wherein the image cutouter is configured to change the cutout position for the second image in the first image based on the first change amount when the image cutouter determines that the change of the position of the following vehicle by the position change amount in the first period is caused by the change of the orientation of the vehicle in the first period.

When the position of the following vehicle in the first image has changed due to the change of the orientation of the vehicle, the amount of change of the position in the first image is substantially equal to an amount of change of position of the following vehicle in the first image, which amount is calculated based on the first change amount. Accordingly, the cutout position may be changed based on any of the first change amount and the position change amount. In the present image display device, since the cutout position is changed based on the first change amount, the cutout position can be changed appropriately.

(10) The image display device according to the above form (8), wherein the image cutouter is configured to change the cutout position for the second image in the first image based on the position change amount when the image cutouter determines that the change of the position of the following vehicle by the position change amount in the first period is caused by the change of the orientation of the vehicle in the first period.

In the configuration described above, since the cutout position is changed based on the position change amount, the following vehicle is contained in the second image also after the change of the orientation of the vehicle. This configuration reduces a situation in which the following vehicle disappears from the display due to the change of the orientation of the vehicle.

(11) The image display device according to any one of the above forms (1) through (10), wherein the image cutouter is configured to change the cutout position for the second image in the first image when a following vehicle following the vehicle is detected in the first image.

In the configuration described above, the image cutouter can appropriately display the following vehicle on the display when there is a following vehicle behind the vehicle.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment by reference to the drawings.

Figure 1:
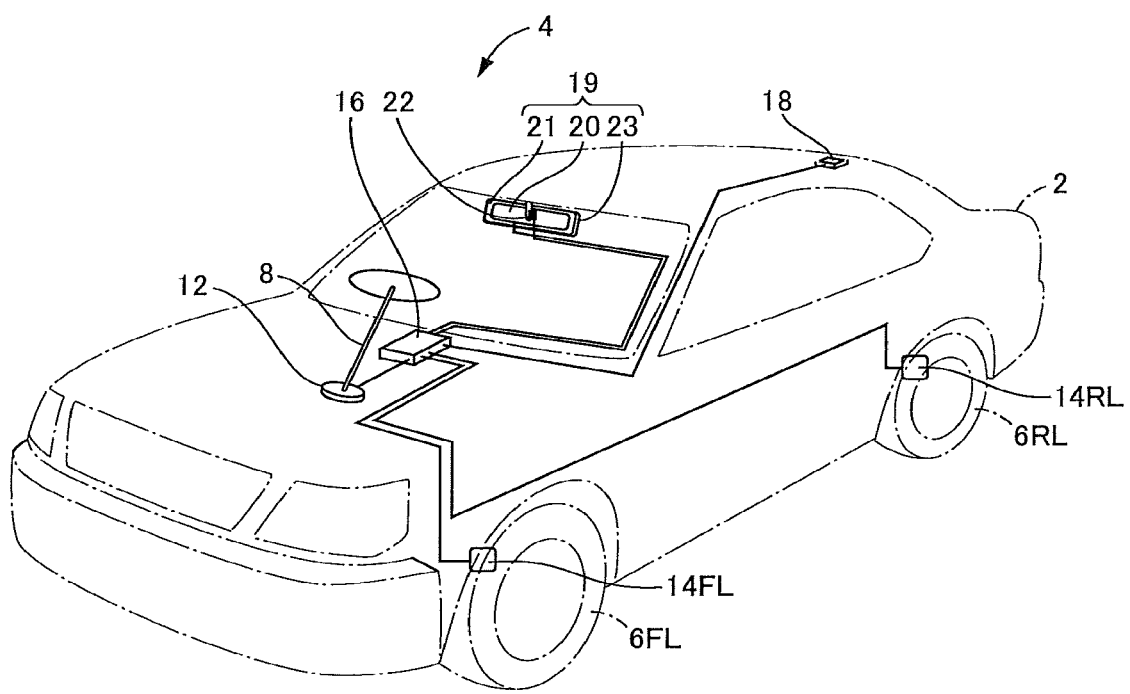
FIG. 1 is a view illustrating an overall construction of a vehicle installed with an image display device according to a first embodiment.
Figure 2:
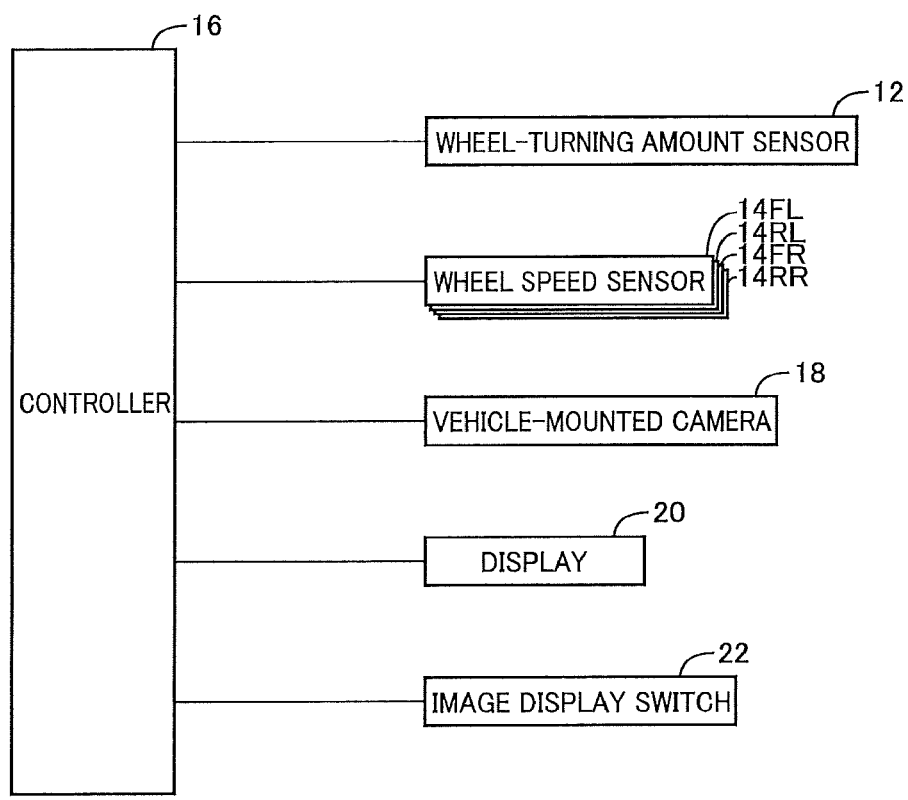
FIG. 2 is a schematic view illustrating electric connection of a controller in the first embodiment.

FIG. 1 is a view of a vehicle 2 on which an image display device 4 according to a first embodiment is mounted. FIG. 2 is a schematic view illustrating an overall configuration of the image display device 4 according to the first embodiment. As illustrated in FIG. 1, the vehicle 2 includes the image display device 4, wheels 6, a steering 8, a wheel-turning amount sensor 12, and wheel speed sensors 14. As illustrated in FIG. 2, the image display device 4 includes a controller 16, a vehicle-mounted camera 18, a rear image display device 19, and an image display switch 22.

The wheel-turning amount sensor 12 is provided on the steering 8 of the vehicle 2 to detect an angle of rotation of the steering 8, i.e., a rudder angle of the steering 8 and output a signal to the controller 16 in accordance with the detected rudder angle. The wheel-turning amount sensor 12 includes a light-emitting diode, a slit board, and a phototransistor, for example. In the case where the wheel-turning amount sensor 12 has such a configuration, light emitted from the light-emitting diode is received or intercepted by the slit board rotating with rotation of a steering shaft, and an ON/OFF state of the phototransistor is switched to detect the rudder angle of the steering 8. It is assumed that when the steering 8 is turned in the clockwise direction in a state in which the vehicle 2 travels straight (a neutral state), the rudder angle becomes a positive value, and when the steering 8 is turned in the counterclockwise direction from the neutral state, the rudder angle becomes a negative value.

The wheel speed sensors 14 (14FL, 14RL, 14FR, 14RR) having the same construction are respectively fixed near rotors, not illustrated, which are rotated with the respective wheels 6 (6FL, 6RL, 6FR, 6RR). Each of the wheel speed sensors 14 detects a change of a magnetic field generated by rotation of a corresponding one of the rotors and outputs the detected change to the controller 16 as a velocity pulse. While the wheel speed sensors 14FL, 14RL are respectively provided on the front left wheel 6FL and the rear left wheel 6RL as illustrated in FIG. 1, the wheel speed sensors 14FR, 14RR are respectively provided on the front right wheel and the rear right wheel, not illustrated. The controller 16 includes a CPU, a ROM, an EEPROM, a RAM, and a communication interface. The CPU executes various kinds of control by executing programs stored in the ROM. The wheel-turning amount sensor 12, the wheel speed sensors 14, the vehicle-mounted camera 18, a display 20, and the image display switch 22 are connected to the controller 16 such that these devices are communicable with the controller 16. The controller 16 creates an image to be displayed by cutting out a portion of an image taken by the vehicle-mounted camera 18. It is noted that the image taken by the vehicle-mounted camera 18 may be hereinafter referred to as "taken image". The controller 16 then displays the created image on the display 20. This image cutout processing for cutting out a portion of an image taken by the vehicle-mounted camera 18 is executed each time when a predetermined length of time is elapsed after the controller 16 receives an ON signal from the image display switch 22. The image cutout processing will be described later in detail.

The vehicle-mounted camera 18 is provided on a rear end portion of a roof portion of the vehicle 2 or on a rear end portion of the vehicle 2 to at least take an image in a visible light region. One example of the vehicle-mounted camera 18 is a CCD camera. The vehicle-mounted camera 18 takes an image representing a view behind the vehicle 2 and creates image data based on the image. The vehicle-mounted camera 18 transmits the created image data to the controller 16. The image taken by the vehicle-mounted camera 18 contains a lane and a vehicle behind the vehicle 2. It is noted that the vehicle following the own vehicle may be hereinafter referred to as "following vehicle".

The rear image display device 19 is mounted on the roof portion defining a passenger compartment. The rear image display device 19 is disposed in front of a driver's seat and between the driver's seat and an assistant-driver's seat. The rear image display device 19 includes the display 20, a mirror surface 21, and a frame 23. The mirror surface 21 has substantially the same size as the frame 23 and is fitted in the frame 23. The mirror surface 21 reflects a view behind the vehicle 2. The display 20 is formed in a portion of the mirror surface 21. The display 20 is smaller in size than the mirror surface 21 and disposed at substantially the center of the mirror surface (see FIG. 3C). That is, the mirror surface 21 includes: a mirror surface portion 21a formed on a surface of the display 20; and a mirror surface portion 21b located around the display 20. The display 20 displays an image based on image data created by the vehicle-mounted camera 18 and output from the controller 16.

In a state in which the display 20 is not operated, each of the mirror surface portion 21a and the mirror surface portion 21b serves as an optical mirror (a mirror-surface showing state). In a state in which the display 20 is being operated, the image is displayed on the display 20 and viewable by an occupant (a display showing state). In the case where the mirror surface portion 21a and the mirror surface portion 21b reflect a rear-side view in a state in which the image is displayed on the display 20 in the display showing state, a viewability of the image displayed on the display 20 is reduced. Thus, the angle of the frame 23 is adjusted in the display showing state such that the mirror surface 21 faces a ceiling of the vehicle 2 so as not to reflect the rear-side view.

The image display switch 22 is provided at a position at which the rear image display device 19 and the roof portion of the vehicle 2 are connected to each other. The image display switch 22 sends the controller 16 a signal for switching a display state (view showing state) of the rear image display device 19 between the mirror-surface showing state and the display showing state. An ON/OFF state of the image display switch 22 is switched by the occupant. When the image display switch 22 is switched to the ON state, the display state of the rear image display device 19 is switched from the mirror-surface showing state to the display showing state, and the image taken by the vehicle-mounted camera 18 is displayed on the display 20. When the image display switch 22 is switched to the OFF state, the display state of the rear image display device 19 is switched from the display showing state to the mirror-surface showing state, and the mirror surface 21 reflects the view behind the vehicle.

Figure 3A:
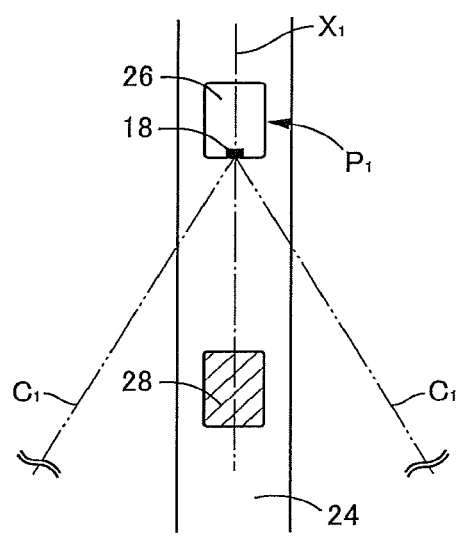
FIG. 3A is a view of a situation in which an own vehicle and a vehicle following the own vehicle (hereinafter may be referred to as "following vehicle") are driving on a straight lane, with the own vehicle and the following vehicle viewed from above.
Figure 3B:
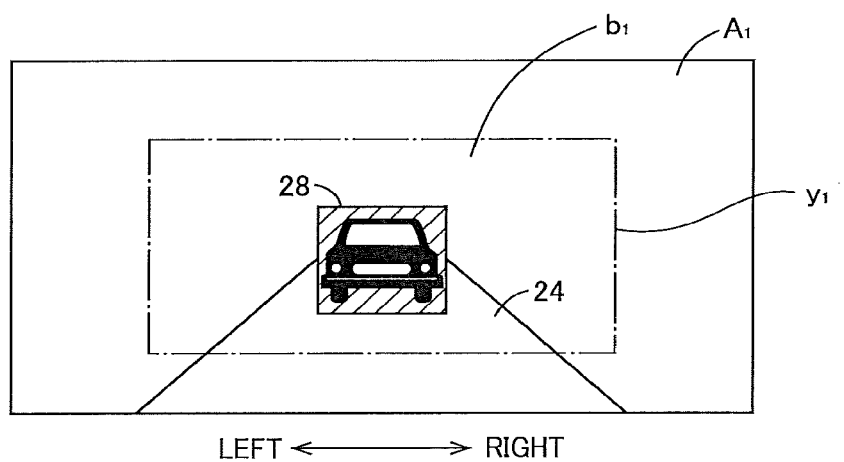
FIG. 3B is a view of an image taken by a camera, the image representing a view behind the own vehicle located at a vehicle position $P_1$ in FIG. 3A.
Figure 3C:
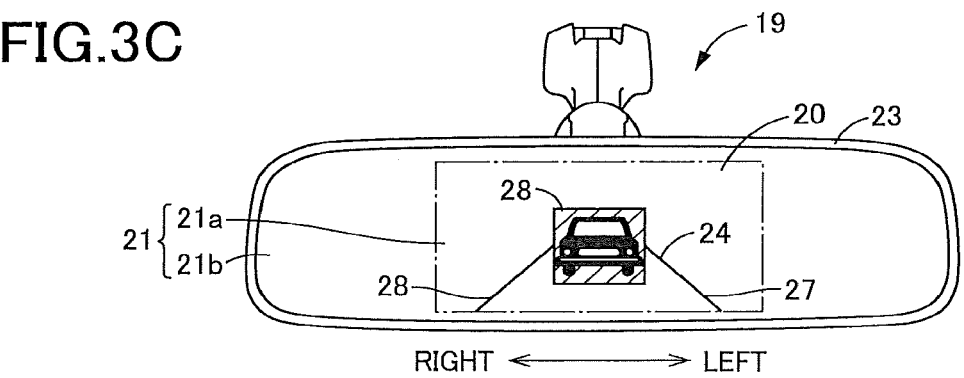
FIG. 3C is a view illustrating a display showing a cutout image in FIG. 3B.

There will be described operations caused by the image cutout processing executed by the controller 16. FIG. 3A is a view of a situation in which an own vehicle 26 and a following vehicle 28 driving on a straight lane 24, with the own vehicle 26 and the following vehicle 28 viewed from above. FIG. 3B is a view illustrating an image $A_1$ taken by the vehicle-mounted camera 18 at a vehicle position $P_1$ in FIG. 3A. In FIG. 3A, the one-dot chain line indicates a longitudinal axis $X_1$ extending along the longitudinal direction of the own vehicle 26, and the two-dot chain lines indicate boundaries $C_1$ of a shooting area of the vehicle-mounted camera 18 of the own vehicle 26. That is, the area located between the two boundaries $C_1$ is the shooting area. In FIG. 3B, the one-dot chain lines indicate a cutout frame $y_1$ for a cutout image $b_1$ that is cut out based on a reference cutout position. The reference cutout position is a cutout position set in the taken image $A_1$ in advance and set at substantially the center of the taken image $A_1$. The cutout image $b_1$ is a portion of the taken image $A_1$ and cut out from the taken image $A_1$ to create an image to be displayed on the display 20. The cutout frame $y_1$ is a frame indicating an area in which the cutout image $b_1$ is cut out from the taken image $A_1$.

When the signal output from the image display switch 22 is the ON signal, the vehicle-mounted camera 18 takes an image. The vehicle-mounted camera 18 is fixed so as to always take an image right behind the own vehicle 26. Thus, in the case where the own vehicle 26 is driving on the straight lane 24, as illustrated in FIG. 3B the controller 16 receives an image in which the lane 24 and the following vehicle 28 are located at substantially the center of the taken image $A_1$. The controller 16 then executes the image cutout processing based on the received taken image $A_1$. When the own vehicle 26 is driving on the straight lane 24, the orientation (a direction of movement) of the own vehicle 26 does not change, and accordingly the controller 16 sets the cutout position in the taken image $A_1$ to the reference cutout position. The controller 16 sets the cutout frame $y_1$ to the reference cutout position in FIG. 3B based on the reference cutout position, cuts out an image enclosed with the set cutout frame $y_1$, as the cutout image $b_1$, from the taken image $A_1$, and creates an image to be displayed by flipping the cutout image $b_1$ relative to the X-axis direction (i.e., a lateral flip of the cutout image $b_1$). The controller 16 outputs a signal based on the created image to the display 20 and controls the display 20 to display the created image.

Figure 4A:
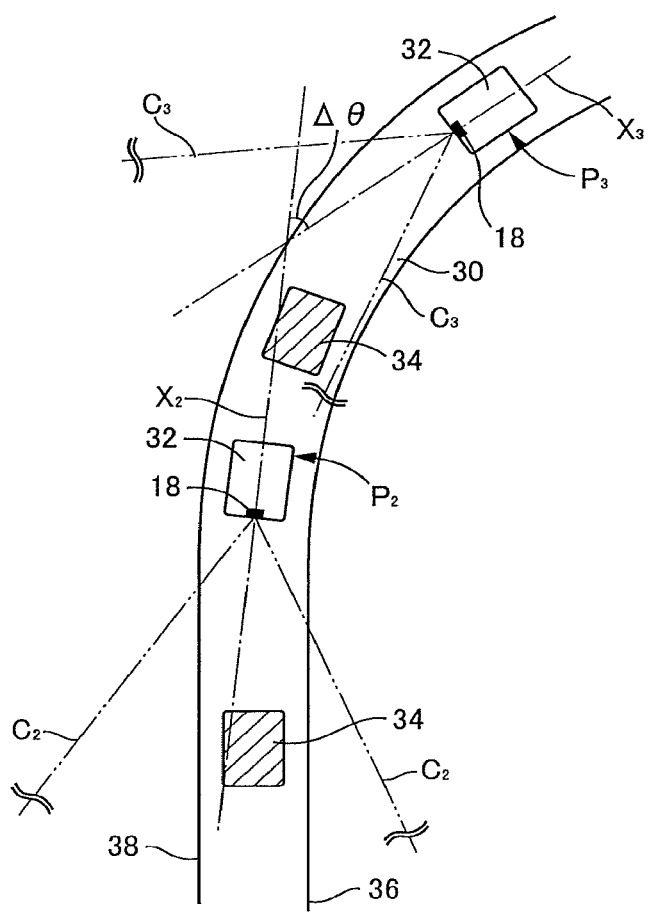
FIG. 4A is a view of a situation in which an own vehicle and the following vehicle are driving on a curve, with the own vehicle and the following vehicle viewed from above.
Figure 4B:
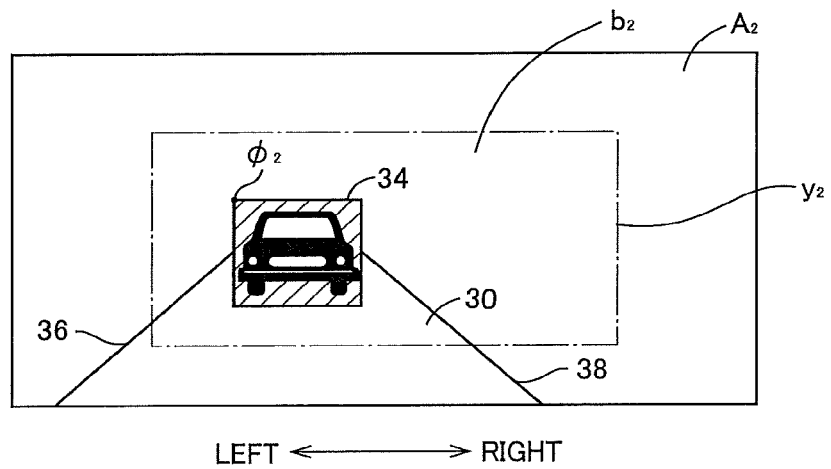
FIG. 4B is a view of an image taken by a camera, the image representing a view behind the own vehicle located at a vehicle position $P_2$ in FIG. 4A.
Figure 4C:
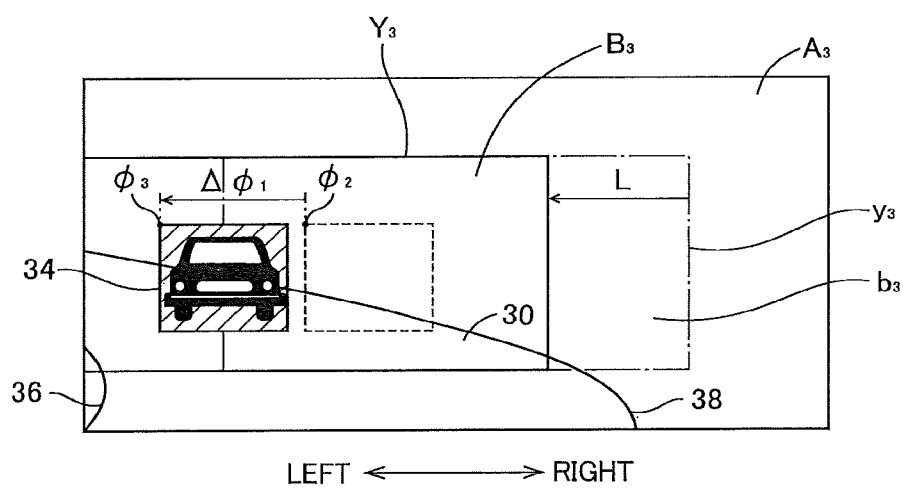
FIG. 4C is a view of an image taken by the camera, the image representing a view behind the own vehicle located at a vehicle position $P_3$ in FIG. 4A.

FIG. 4A is a view of a situation in which an own vehicle 32 and a following vehicle 34 are driving on a curve 30, with the own vehicle 32 and the following vehicle 34 viewed from above. FIG. 4B is a view of an image $A_2$ taken by the vehicle-mounted camera 18 when the own vehicle 32 is located at a vehicle position $P_2$ in FIG. 4A. FIG. 4C is a view of an image $A_3$ taken by the vehicle-mounted camera 18 when the own vehicle 32 is located at a vehicle position $P_3$ in FIG. 4A. In FIG. 4A, the one-dot chain lines indicate the longitudinal axes $X_2$, $X_3$ of the own vehicle 26, and the two-dot chain lines indicate boundaries $C_2$, $C_3$ of shooting areas of the vehicle-mounted camera 18. In FIG. 4A, the own vehicle 32 is moved from the vehicle position $P_2$ to the vehicle position $P_1$. The curve 30 is defined by (i) an inner dividing line 36 defining an inner side of the curve and (ii) an outer dividing line 38 defining an outer side of the curve.

It is noted that FIG. 4A illustrates the vehicle position $P_2$ and the vehicle position $P_3$ to clearly indicate an amount $\Delta\theta$ of change of the orientation of the vehicle 32 between the orientation of the own vehicle 32 located at the vehicle position $P_2$ and the orientation of the own vehicle 32 located at the vehicle position $P_3$. In actual control, however, a time required for the own vehicle 32 to move from the vehicle position $P_2$ to the vehicle position $P_3$ is considerably short, for example, the time is less than 0.1 second. It is noted that this time is one example of a first period.

In FIG. 4B, the one-dot chain lines indicate a cutout frame $y_2$ for a cutout image $b_2$ that is cut out based on the reference cutout position in the taken image $A_2$ when the own vehicle 32 is located at the vehicle position $P_2$. In FIG. 4C, the solid lines indicate a cutout frame $Y_3$ for a cutout image $B_3$ that is cut out based on a cutout position in the taken image $A_3$ when the own vehicle 32 is located at the vehicle position $P_3$, and the one-dot chain lines indicate a cutout frame $y_3$ for a cutout image $b_3$ that is cut out based on the reference cutout position. In each of the images $A_2$, $A_3$ taken by the vehicle-mounted camera 18, as illustrated in FIGS. 4B and 4C, it is assumed that a direction directed from the inner dividing line 36 toward the outer dividing line 38 (i.e., a direction directed from an inner side of the curve 30 toward an outer side of the curve 30) in the lateral direction (i.e., the X-axis direction) of the taken image is defined as the right direction, and a direction directed from the outer dividing line 38 toward the inner dividing line 36 (i.e., a direction directed from the outer side of the curve 30 toward the inner side of the curve 30) in the lateral direction of the taken image is defined as the left direction.

When the own vehicle 32 is driving on the curve 30, as illustrated in FIG. 4B, the controller 16 obtains an image in which the curve 30 and the following vehicle 34 are located to the left of substantially the center of the taken image $A_2$ (on an inner portion of the curve 30). In this image $A_2$, the following vehicle 34 is contained in the cutout image $b_2$ in the cutout frame $y_2$. The orientation of the own vehicle 32 changes during travel of the own vehicle 32 from the vehicle position $P_2$ to the vehicle position $P_3$. As a result, the following vehicle 34 is located outside the cutout frame $y_3$ for the cutout image $b_3$ in the taken image $A_3$, and the following vehicle 34 is not contained in the cutout image $b_3$. That is, the change of the orientation of the own vehicle 32 causes the display 20 not to display the following vehicle 34. In the present embodiment, to solve this problem, the cutout frame $Y_3$ is moved from the reference cutout position such that the cutout image $B_3$ cut out from the taken image $A_3$ contains the moved following vehicle 34.

There will be described movement of the cutout frame $Y_3$ from the reference cutout position and a distance L of the movement (hereinafter may be referred to as "moving distance L"). First, the controller 16 obtains the rudder angle and the speed of the own vehicle 32 located at the vehicle position $P_3$. The controller 16 then calculates, based on the obtained rudder angle and speed of the own vehicle 32, an amount $\Delta\theta$ of change of the orientation of the own vehicle 32 between the vehicle position $P_2$ and the vehicle position $P_3$. The amount $\Delta\theta$ of change of the orientation of the own vehicle 32 may be obtained by a mathematical relationship among the rudder angle and the speed of the own vehicle 32 located at the vehicle position $P_3$, the wheelbase of the own vehicle 32, and a length of time required for the own vehicle 32 to move from the vehicle position $P_2$ to the vehicle position $P_3$. The controller 16 then identifies an X-coordinate $\varphi_2$ of the following vehicle 34 in the taken image $A_2$ and an X-coordinate $\varphi_3$ of the following vehicle 34 in the taken image $A_3$. It is noted that each of the X-coordinates $\varphi_2$, $\varphi_3$ of the following vehicle 34 in the respective taken images $A_2$, $A_3$ is identified as a position on the X axis that extends in the lateral direction from an origin point (i.e., a reference point) assumed to be located at an upper left corner of the taken image.

The controller 16 calculates an amount $\Delta\varphi_1$ of change of the position of the following vehicle 34 in the X-axis direction in the taken image $A_3$ between the vehicle position $P_2$ and the vehicle position $P_3$, based on a difference between the identified X-coordinates $\varphi_2$, $\varphi_3$ of the following vehicle 34. The controller 16 then calculates the distance L of movement of the cutout frame $Y_3$ in the taken image $A_3$. The moving distance L is a distance by which the cutout frame $Y_3$ is to be moved from the reference cutout position in the taken image $A_3$. The cutout frame $Y_3$ is moved from the reference cutout position by the moving distance L, and the cutout image $B_3$ is cut out based on the moved cutout frame $Y_3$. The moving distance L is calculated based on the calculated amount $\Delta\varphi_1$ of change of the position of the following vehicle 34 in the taken image $A_3$ and/or based on the amount $\Delta\theta$ of change of the orientation of the own vehicle 32.

In the case where the moving distance L is calculated from the amount $\Delta\varphi_1$ of change of the position of the following vehicle 34, moving the cutout frame $Y_3$ from the reference cutout position by the change amount $\Delta\varphi_1$ establishes a state in which the following vehicle 34 in the cutout image $B_3$ in the taken image $A_3$ in FIG. 4C when the own vehicle 32 is located at the vehicle position $P_3$ is located at the same position as the following vehicle 34 in the cutout image $b_2$ in the taken image $A_2$ in FIG. 4B when the own vehicle 32 is located at the vehicle position $P_2$, for example. Since a relationship between the position of the following vehicle 34 and the reference cutout position before the change of the position of the following vehicle 34 is maintained, the moving distance L is equal to the amount $\Delta\varphi_1$ of change of the position of the following vehicle 34.

There will be next described the amount $\Delta\theta$ of change of the orientation of the own vehicle 32 and an amount $\Delta\varphi_2$ of change of a position of a display object in a taken image due to the amount $\Delta\theta$ of change of the orientation of the vehicle. A correlation between the amount $\Delta\theta$ of change of the orientation and the amount $\Delta\varphi_2$ of change of the position may be obtained as follows, for example. An object is placed behind the vehicle 2 at a predetermined distance from the vehicle 2. This predetermined distance may be a distance between the own vehicle 32 and the following vehicle 34 in the case where the following vehicle 34 is on the taken images $A_2$, $A_3$ in the size illustrated in FIGS. 4B and 4C, for example. The orientation of the vehicle 2 is changed gradually in this state, and both of the magnitude of the amount of change of the orientation of the vehicle and the magnitude of the amount of change of the position of the object in the taken image are measured, thereby obtaining a correlation between the magnitude of the amount of change of the orientation of the vehicle and the magnitude of the amount of change of the position of the object in the taken image. It is noted that the correlation is a relationship in which the change amount $\Delta\varphi_2$ is greater when the amount $\Delta\theta$ of change of the orientation of the vehicle is large than when the amount $\Delta\theta$ of change of the orientation of the vehicle is small.

In the case where the moving distance L is calculated from the amount $\Delta\theta$ of change of the orientation of the own vehicle 32, the controller 16 in advance obtains the correlation between the amount $\Delta\theta$ of change of the orientation of the own vehicle 32 and the amount $\Delta\varphi_2$ of change of the position of the object in the taken image. From this correlation and the amount $\Delta\theta$ of change of the orientation of the own vehicle 32, the controller 16 calculates the amount $\Delta\varphi_2$ of change of the position of the following vehicle 34 in the taken image $A_3$ due to the amount of change of the orientation of the own vehicle 32.

When the calculated amount $\Delta\varphi_2$ of change of the position of the following vehicle 34 and the amount $\Delta\varphi_1$ of change of the position of the following vehicle 34 are compared with each other, and the change of the position of the following vehicle 34 in the taken image between the vehicle position $P_2$ and the vehicle position $P_3$ is caused due to the change of the orientation of the own vehicle 32, the calculated amount $\Delta\varphi_2$ of change of the position of the following vehicle 34 is equal to the amount $\Delta\varphi_1$ of change of the position of the following vehicle 34, and accordingly the moving distance L is equal to the calculated amount $\Delta\varphi_2$ of change of the position of the object. The controller 16 moves the cutout frame $Y_3$ in the taken image $A_3$ in the left direction, i.e., toward the inner side of the curve, by the moving distance L calculated from the reference cutout position. The controller 16 cuts out the cutout image $B_3$ from the taken image $A_3$ based on the moved cutout frame $Y_3$, creates an image to be displayed by flipping the cutout image $B_3$ relative to the X-axis direction, and sends the display 20 a signal based on the image to be displayed.

Figure 5A:
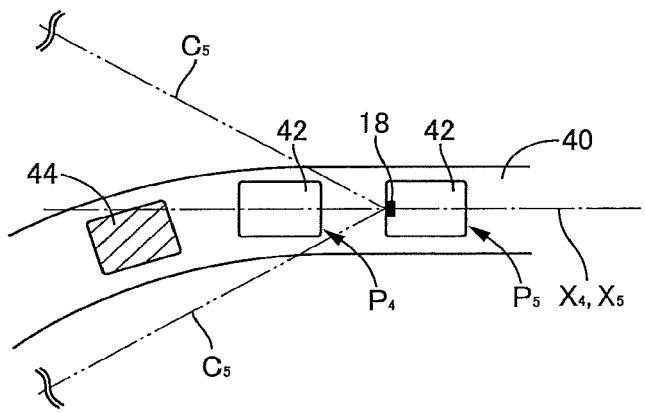
FIG. 5A is a view of a situation in which one of an own vehicle and the following vehicle is driving on a curve, with the own vehicle and the following vehicle viewed from above.
Figure 5B:
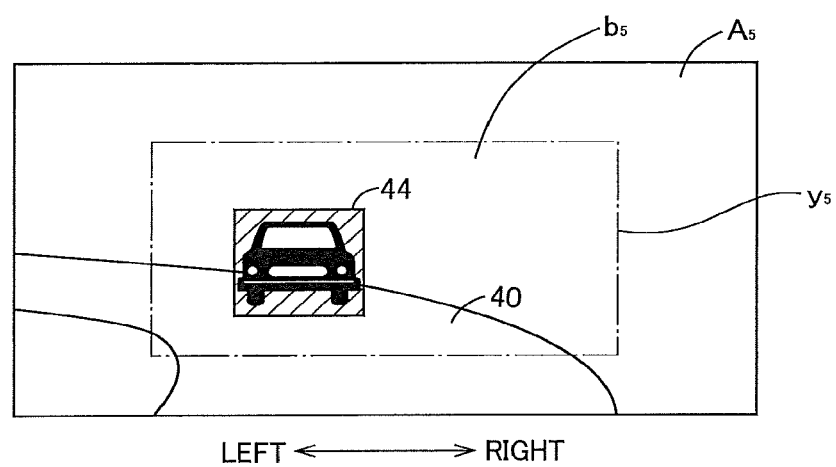
FIG. 5B is a view of an image taken by a camera, the image representing a view behind the own vehicle located at a vehicle position $P_5$ in FIG. 5A.

FIG. 5A is a view of (i) an own vehicle 42 driving on a straight portion of a lane 40 after driving on a curve of the lane 40 and (ii) a following vehicle 44 at the timepoint when the own vehicle 42 is located at a vehicle position $P_5$, with the own vehicle 42 and the following vehicle 44 viewed from above. FIG. 5B is a view of an image $A_5$ taken by the vehicle-mounted camera 18 when the own vehicle 42 is located at the vehicle position $P_5$ in FIG. 5A. In FIG. 5A, the own vehicle 42 is moved from the vehicle position $P_4$ to the vehicle position $P_5$. The one-dot chain line indicates longitudinal axes $X_4$, $X_5$ of the own vehicle 42 located at the vehicle position $P_4$, $P_5$. The two-dot chain lines indicate boundaries $C_5$ of a shooting area of the vehicle-mounted camera 18 when the own vehicle 42 is located at the vehicle position $P_5$. In FIG. 5B, the one-dot chain line indicates a cutout frame $y_5$ for a cutout image $b_5$ that is cut out based on the reference cutout position.

In the case where the own vehicle 42 is driving on the straight portion of the lane 40 after driving on the curve (that is, the own vehicle 42 is located at the vehicle position $P_5$), as illustrated in FIG. 5B, the controller 16 obtains an image in which the lane 40 and the following vehicle 44 at the timepoint when the own vehicle 42 is located at the vehicle position $P_5$ are located at substantially the center of the taken image $A_5$ or located slightly to the left of substantially the center of the taken image $A_5$. The controller 16 then executes the image cutout processing based on the obtained image $A_5$. While the own vehicle 42 is driving on the straight portion of the lane 40 between the vehicle position $P_4$ and the vehicle position $P_5$ after driving on the curve of the lane 40, the orientation of the own vehicle 42 does not change, or the amount of change of the orientation of the own vehicle 42 is small. Thus, the controller 16 determines the cutout frame $y_5$ in the taken image $A_5$ to the reference cutout position. The controller 16 then cuts out the cutout image $b_5$ from the taken image $A_5$ based on the cutout frame $y_5$ located at the reference cutout position, creates an image to be displayed by flipping the cutout image $b_5$ relative to the X-axis direction, and sends the display 20 a signal based on the image to be displayed.

As described above, the change of the cutout position in the image cutout processing executed by the controller 16 is executed when the orientation of the vehicle 2 is changed by the vehicle 2 driving on the curve, for example. In this change, the cutout position for the cutout frame $Y_3$ is moved from the reference cutout position in a direction directed from the outer dividing line 38 toward the inner dividing line 36 in the taken image $A_3$. When the vehicle 2 is driving on the straight portion, and its orientation does not change, the controller 16 determines the cutout position for the cutout frame to the reference cutout position.

Figure 6:
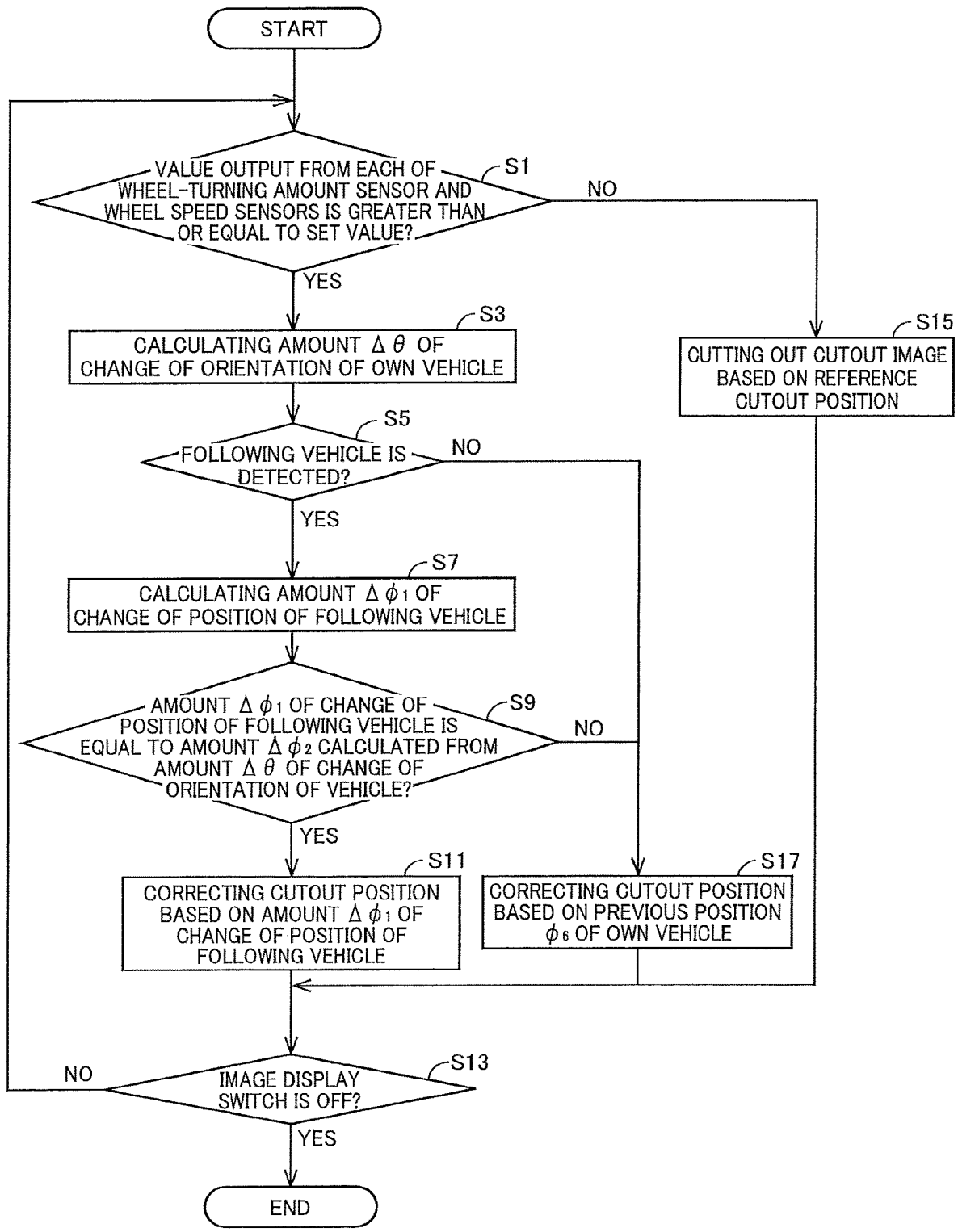
FIG. 6 is a flow chart illustrating an image cutout processing executed by the controller in the first embodiment.

There will be described a flow of the image cutout processing executed by the controller 16 with reference to the flow chart in FIG. 6. This flow begins when the image display switch 22 is turned to ON. From the timing just after the image cutout processing is started, the controller 16 obtains an image taken by the vehicle-mounted camera 18 each time when a predetermined length of time is elapsed and stores the taken image in the RAM for a specific length of time. It is noted that the taken images are stored in the RAM for the specific length of time and deleted in the order in which the images are taken.

This flow begins with S1 at which the controller 16 receives signals from the wheel-turning amount sensor 12 and the wheel speed sensors 14 of the own vehicle 32 located at the vehicle position $P_3$ and determines whether a value output from each of the sensors is greater than or equal to a corresponding set value. When the value output from each of the wheel-turning amount sensor 12 and the wheel speed sensors 14 is greater than or equal to the set value, this flow goes to S3. When the value output from at least one of the wheel-turning amount sensor 12 and each of the wheel speed sensors 14 is less than the set value, this flow ends.

The controller 16 at S3 obtains the amount $\Delta\theta$ of change of the orientation of the own vehicle 32. For example, when the own vehicle 32 is located at the vehicle position $P_3$ in FIG. 4A, the controller 16 obtains the rudder angle and the speed of the own vehicle 32 based on the values output from the wheel-turning amount sensor 12 and the wheel speed sensors 14 of the own vehicle 32 located at the vehicle position $P_3$. The controller 16 calculates, based on the obtained rudder angle and speed of the own vehicle 32, the amount $\Delta\theta$ of change of the orientation of the own vehicle 32, which change is caused when the own vehicle 32 is moved from the vehicle position $P_2$ to the vehicle position $P_3$. The controller 16 at S5 determines whether the following vehicle 34 is detected in the taken image $A_3$ taken by the vehicle-mounted camera 18 when the own vehicle 32 is located at the vehicle position $P_3$. When the following vehicle 34 is detected in the taken image $A_3$, this flow goes to S7. When the following vehicle 34 is not detected, this flow goes to S13.

The controller 16 at S7 identifies the X-coordinate $\varphi_3$ of the following vehicle 34 in the taken image $A_3$ and the X-coordinate $\varphi_2$ of the following vehicle 34 in the taken image $A_2$ stored in the RAM and taken when the own vehicle 32 is located at the vehicle position $P_2$. The controller 16 calculates the amount $\Delta\varphi_1$ of change of the position of the following vehicle 34 based on a difference between the X-coordinate $\varphi_3$ and the X-coordinate $\varphi_2$. The controller 16 at S9 converts the amount $\Delta\theta$ of change of the orientation of the own vehicle 32 which is calculated at S3, to the amount $\Delta\varphi_2$ of change of the position in the taken image $A_3$ and determines whether the amounts $\Delta\varphi_1$, $\Delta\varphi_2$ are equal to each other. This determination is made based on whether a difference between the amounts $\Delta\varphi_1$, $\Delta\varphi_2$ is less than or equal to a threshold value. This processing enables the controller 16 to determine whether the change of the position of the following vehicle 34 in the taken image is caused due to the change of the orientation of the own vehicle 32.

When the difference between the amounts $\Delta\varphi_1$, $\Delta\varphi_2$ is less than or equal to the set value, it is determined that the amounts $\Delta\varphi_1$, $\Delta\varphi_2$ are equal to each other and that the change of the position of the following vehicle 34 in the taken image $A_3$ is caused due to the change of the orientation of the own vehicle 32, and this flow goes to S11. When the difference between the amounts $\Delta\varphi_1$, $\Delta\varphi_2$, is greater than the set value, the amounts $\Delta\varphi_1$, $\Delta\varphi_2$ are not equal to each other, and the change of the position of the following vehicle 34 in the taken image $A_3$ is not caused due to the change of the orientation of the own vehicle 32, that is, there is a possibility that the change of the position of the following vehicle 34 in the taken image $A_3$ is caused by, e.g., movement of the following vehicle 34 in a direction parallel with the widthwise direction of the vehicle. Thus, this flow goes to S15. The controller 16 at S11 determines the amount $\Delta\varphi_1$ calculated at S7, to the distance L of the movement of the cutout position in the taken image $A_3$ and moves the cutout position for the cutout frame $Y_3$ from the reference cutout position by the moving distance L.

The direction in which the cutout frame $Y_3$ is to be moved is determined based on whether the value of the rudder angle of the own vehicle 32 at the vehicle position $P_3$ which is obtained in at S3 is positive or negative. When the value of the rudder angle is positive (that is, the own vehicle 32 is driving on a right curve), the cutout frame $Y_3$ is moved in the left direction in the taken image $A_3$. When the value of the rudder angle is negative (that is, the own vehicle 32 is driving on a left curve), the cutout frame $Y_3$ is moved in the right direction in the taken image $A_3$. The controller 16 then cuts out the cutout image $B_3$ based on the moved cutout frame $Y_3$, creates an image to be displayed by flipping the cutout image $B_3$ relative to the X-axis direction, and sends the display 20 a signal based on the image to be displayed. The controller 16 at S13 determines whether the signal output from the image display switch 22 is an OFF signal. When the signal output from the image display switch 22 is the OFF signal, this flow ends. When the signal output from the image display switch 22 is not the OFF signal, this flow returns to S1.

Figure 7A:
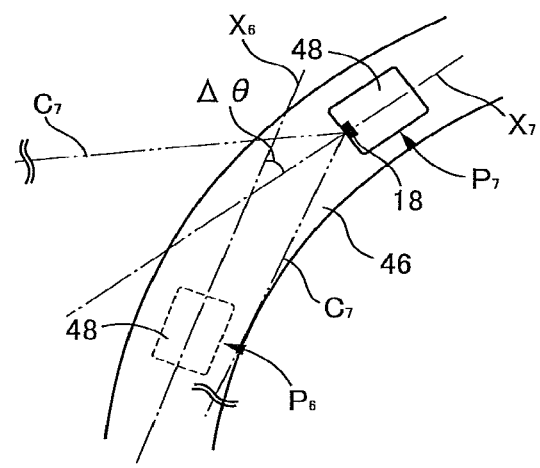
FIG. 7A is a view of a situation in which an own vehicle is driving on a curve, with the own vehicle viewed from above.
Figure 7B:
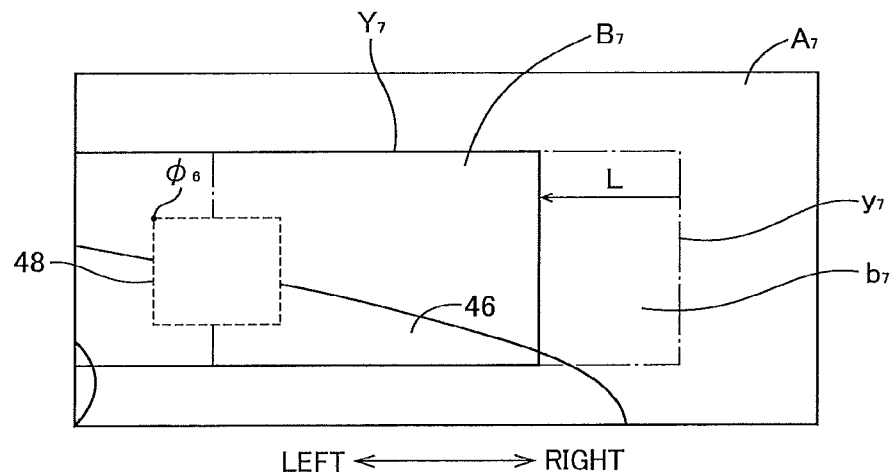
FIG. 7B is a view of an image taken by a camera, the image representing a view behind the own vehicle located at a vehicle position $P_7$ in FIG. 7A.

When a negative decision (NO) is made at S1, this flow goes to S15 at which the controller 16 cuts out the cutout image based on the reference cutout position, creates an image to be displayed by flipping the cutout image relative to the X-axis direction, and sends the display 20 a signal based on the image to be displayed. Upon completion of the processing at S15, this flow goes to S13. When a negative decision (NO) is made at S5 or S7, this flow goes to S17. The processing at S17 will be explained with reference to FIGS. 7A and 7B illustrating a situation in which no vehicle follows an own vehicle 48. FIG. 7A is a view of a situation in which the own vehicle 48 is driving on a curve 46, with the own vehicle 48 viewed from above. FIG. 7B is a view of an image $A_7$ taken by the vehicle-mounted camera 18 when the own vehicle 48 is located at a vehicle position $P_7$ in FIG. 7A. In FIG. 7A, a vehicle position $P_6$ is a position of the own vehicle 48 a particular length of time before the own vehicle 48 is located at the vehicle position $P_7$. The one-dot chain lines indicate longitudinal axes $X_6$, $X_7$ of the own vehicle 48 located at vehicle positions $P_6$, $P_7$. The two-dot chain lines indicate boundaries $C_7$ of a shooting area of the vehicle-mounted camera 18 when the own vehicle 48 is located at the vehicle position $P_7$. In FIG. 7B, the one-dot chain line indicates a cutout frame $y_7$ located at the reference cutout position, and the solid line indicates a moved cutout frame $Y_7$. The particular length of time is a relatively short time, for example, the particular length of time is less than 0.1 second.

The controller 16 at S17 obtains a rudder angle and a speed of the own vehicle 48 at the vehicle position $P_7$. The controller 16 then identifies, based on the obtained rudder angle and speed of the own vehicle 48 and the particular length of time, an X-coordinate $\varphi_6$ of the own vehicle 48 in a taken image $A_7$ when the own vehicle 48 is located at the vehicle position $P_6$. The controller 16 then calculates the moving distance L for moving the cutout position such that the own vehicle 48 identified by its X-coordinate $\varphi_6$ the particular length of time before the own vehicle 48 is located at the vehicle position $P_7$ is moved to an inside of the cutout frame $Y_7$ in the taken image $A_7$.

The controller 16 moves the cutout frame $Y_7$ from the reference cutout position by the moving distance L. A direction in which the cutout frame $Y_7$ is to be moved is determined based on whether the value of the rudder angle of the own vehicle 48 located at the vehicle position $P_7$ is positive or negative. With this processing, an area around the own vehicle 48 driving the particular length of time before the own vehicle 48 is located at the vehicle position $P_7$ is located inside the cutout frame $Y_7$ even after the change of the orientation of the own vehicle 48. That is, an inner portion of the curve 46 behind the own vehicle 48 located at the vehicle position $P_7$ is located in the cutout frame $Y_7$. The controller 16 then cuts out the cutout image $B_7$ based on the cutout frame $Y_7$, creates an image to be displayed by flipping the cutout image $B_7$ relative to the X-axis direction, and sends the display 20 a signal based on the image to be displayed. Upon completion of the processing at S17, this flow goes to S13.

In the present embodiment as described above, even when the following vehicle in the cutout image is moved in the taken image due to a change of the orientation of the vehicle 2, the cutout position for the cutout frame is changed based on the change of the orientation of the vehicle 2, whereby the following vehicle moved in the taken image is located in the cutout frame. This reduces movement of the following vehicle in the image displayed on the display 20 due to the change of the orientation of the vehicle 2. Also, the cutout position for the cutout frame $Y_3$ is changed when the own vehicle 32 is driving on the curve 30. This processing enables the following vehicle 34 to be located in the cutout frame $Y_3$ even when the own vehicle 32 is driving on the curve 30. This reduces movement of the following vehicle 34 in the cutout image $B_3$.

When the orientation of the own vehicle 32 is changed during driving of the own vehicle 32 on the curve 30, the vehicle-mounted camera 18 takes an image of a portion of the curve which is located outside a portion of the curve taken before the change of the orientation of the own vehicle 32. In the present embodiment, the cutout position for the cutout frame $Y_3$ is moved toward an inner side of the curve in the taken image $A_3$, enabling the display 20 to display the curve 30 located behind the own vehicle 32. Accordingly, the curve 30 located behind the own vehicle 32 is displayed on the display 20 even when the orientation of the own vehicle 32 is changed by driving of the own vehicle 32 on the curve 30. Also, the processing at S9 is executed, and the cutout position for the cutout frame $Y_3$ is changed when the position of the following vehicle 34 in the taken image has changed due to a change of the orientation of the own vehicle 32, thereby reducing change of the position of the following vehicle 34 in the cutout image $B_3$ due to the change of the orientation of the own vehicle 32.

When the position of the following vehicle 34 in the taken image has changed due to a change of the orientation of the own vehicle 32, the amount $\Delta\varphi_2$ of change of the position of the object in the taken image due to the amount $\Delta\theta$ of change of the orientation of the own vehicle 32 is calculated by obtaining a correlation between the amount $\Delta\varphi_2$ and the amount $\Delta\theta$ in advance. This calculation enables the controller 16 to compare the change amount $\Delta\varphi_2$ with the amount $\Delta\varphi_1$ of change of the position of the following vehicle 34 in the taken image and to, based on whether the change amount $\Delta\varphi_1$ is equal to the change amount $\Delta\varphi_2$, determine whether the change of the position of the following vehicle 34 in the taken image is caused due to the change of the orientation of the own vehicle 32.

When the position of the following vehicle 34 in the taken image $A_3$ has changed due to the change of the orientation of the own vehicle 32, the amount $\Delta\varphi_1$ of change of the position of the following vehicle 34 in the taken image $A_3$ is substantially equal to the amount 42 of change of the position of the following vehicle 34 in the taken image $A_3$, which amount is calculated based on the amount $\Delta\theta$ of change of the orientation of the own vehicle 32. Thus, the cutout position for the cutout frame $Y_3$ may be moved based on any of the amount of change $\Delta\theta$ and the change amount $\Delta\varphi_1$. In the present embodiment, since the cutout position for the cutout frame $Y_3$ is changed based on the amount $\Delta\varphi_1$ of change of the position of the following vehicle 34 in the taken image $A_3$, relative positions of the cutout image $B_3$ and the following vehicle 34 are kept even after the orientation of the own vehicle 32 is changed. This reduces an occurrence a situation in which the following vehicle 34 is not displayed on the display 20 due to the change of the orientation of the own vehicle 32.

When the following vehicle is not detected during driving of the own vehicle 48 on the curve 46, the X-coordinate $\varphi_6$ of the own vehicle 48 at the vehicle position $P_6$ at a time before a change of the orientation of the own vehicle 48 is identified in the taken image $A_7$, and the cutout position is moved such that the X-coordinate $\varphi_6$ of the own vehicle 48 is located in the cutout frame $Y_7$. This processing reduces an occurrence of a situation in which the curve 46 behind the own vehicle 48 is not displayed on the display 20 when the own vehicle 48 is located at the vehicle position $P_7$.

When each of the rudder angle and the speed of the own vehicle 32 becomes greater than or equal to the set value, the controller 16 moves the cutout frame $Y_3$, enabling the display 20 to appropriately display an image representing a view behind the own vehicle 32 when the own vehicle 32 is driving on the curve 30. When the following vehicle 34 exists at a rear of the own vehicle 32, the controller 16 moves the cutout frame $Y_3$, enabling appropriate display of the following vehicle 34 on the display 20.

First Modification

Figure 8:
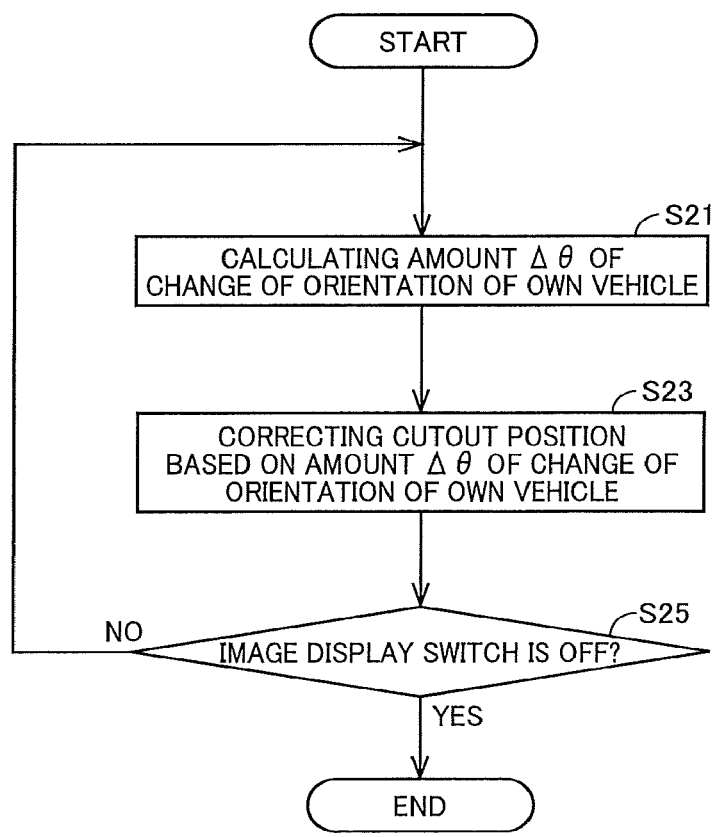
FIG. 8 is a flow chart illustrating an image cutout processing executed by the controller in a first modification of the first embodiment.

There will be described a first modification of the first embodiment. It is noted that an image display device according to the present modification is similar in configuration to the image display device 4 according to the first embodiment, and an explanation thereof is dispensed with. In the present modification, the controller 16 changes the cutout position in the taken image based on the amount $\Delta\theta$ of change of the orientation of the vehicle 2. FIG. 8 illustrates a flow chart representing the image cutout processing executed by the controller 16. This flow begins when the image display switch 22 is turned to ON. From the timing just after the image cutout processing is started, the controller 16 obtains an image taken by the vehicle-mounted camera 18 each time when a predetermined length of time is elapsed and stores the taken image in the RAM for a specific length of time. It is noted that the taken images are stored in the RAM for the specific length of time and deleted in the order in which the images are taken.

As in the processing at S3, the controller 16 at S21 obtains the amount $\Delta\theta$ of change of the orientation of the own vehicle. The controller 16 also obtains the rudder angle and the speed of the own vehicle and calculates the amount $\Delta\theta$ of change of the orientation of the own vehicle for a certain period based on the obtained rudder angle and speed of the own vehicle. For example, the certain period may be a length of time required for the own vehicle 32 in FIG. 4A to move from the vehicle position $P_2$ to the vehicle position $P_3$. This certain period is one example of a first period and may be less than 0.1 second, for example.

The controller 16 at S23 calculates the distance L of movement of the cutout frame in the taken image, from the amount $\Delta\theta$ of change of the orientation of the own vehicle. Since the moving distance L is calculated based on a distance by which the display object is moved in the taken image, the controller 16 preliminarily obtains a correlation between the amount $\Delta\theta$ of change of the orientation of the vehicle and a distance of movement of the display object in the taken image. At S23, the distance L of movement of the cutout frame is calculated based on the amount $\Delta\theta$ of change of the orientation of the vehicle which is obtained at S21 and on the correlation obtained in advance. The moving distance L is greater in the case where the amount $\Delta\theta$ of change of the orientation of the vehicle is large than in the case where the amount $\Delta\theta$ of change of the orientation of the vehicle is small.

The controller 16 then moves the cutout frame from the reference cutout position by the moving distance L in the taken image. The direction in which the cutout frame is to be moved is determined based on whether the value of the rudder angle of the own vehicle which is obtained at S21 is positive or negative. The controller 16 then cuts out the cutout image based on the moved cutout frame, creates an image to be displayed by flipping the cutout image relative to the X-axis direction, and sends the display 20 a signal based on the image to be displayed. The controller 16 at S25 determines whether the signal output from the image display switch 22 is the OFF signal. When the signal output from the image display switch 22 is the OFF signal, this flow ends. When the signal output from the image display switch 22 is not the OFF signal, this flow returns to S21.

In the present modification as described above, even in the case where the display object such as the following vehicle in the cutout image is moved in the taken image due to a change of the orientation of the vehicle 2, the cutout position for the cutout frame is changed based on the change of the orientation of the vehicle 2, enabling the display object moved in the taken image to be located in the cutout frame. This makes it difficult for the object in the image displayed on the display 20 to be moved due to the change of the orientation of the vehicle 2.

When the amount $\Delta\theta$ of change of the orientation of the own vehicle is large, the X-coordinate of the own vehicle is moved in the taken image by a greater amount from the X-coordinate of the own vehicle at a time a particular length of time before the current time, than when the amount $\Delta\theta$ of change of the orientation of the own vehicle is small. In the present modification, the controller 16 increases the distance L of movement of the cutout position for the cutout frame when the amount $\Delta\theta$ of change of the orientation of the own vehicle is large, and reduces the distance L of movement of the cutout position for the cutout frame when the amount $\Delta\theta$ of change of the orientation of the own vehicle is small. This results in an appropriate distance as the distance L of movement of the cutout frame. In the present modification, the controller 16 calculates the distance L of movement of the cutout frame in the taken image, based on the amount of change of the orientation of the own vehicle, without calculating a distance of movement of an object in the taken image, resulting in a reduced load of calculation executed by the controller 16.

Second Modification

There will be described a second modification of the first embodiment. It is noted that an image display device according to the present modification is similar in configuration to the image display device 4 according to the first embodiment, and an explanation thereof is dispensed with. In the first embodiment, the controller 16 determines, based on the rudder angle and the speed of the own vehicle 32, whether the own vehicle 32 is driving on the curve 30. In the present modification, in contrast, the controller 16 does not execute this determination but changes the cutout position in the taken image $A_3$ regardless of the shape of the lane on which the own vehicle 32 drives. Moreover, in the first embodiment, the controller 16 changes the cutout position based on the previous X-coordinate $\varphi_6$ of the own vehicle 48 in the taken image $A_7$ in the case where the following vehicle 34 is not detected or in the case where the amount $\Delta\varphi_2$ calculated from the amount $\Delta\theta$ of change of the orientation of the own vehicle 32 and the amount $\Delta\varphi_1$ of change of the position of the following vehicle 34 in the taken image $A_3$ are not equal to each other. In the present modification, in contrast, the controller 16 does not change the cutout position based on the previous X-coordinate $\varphi_6$ of the own vehicle 48 in the taken image $A_7$.

Figure 9:
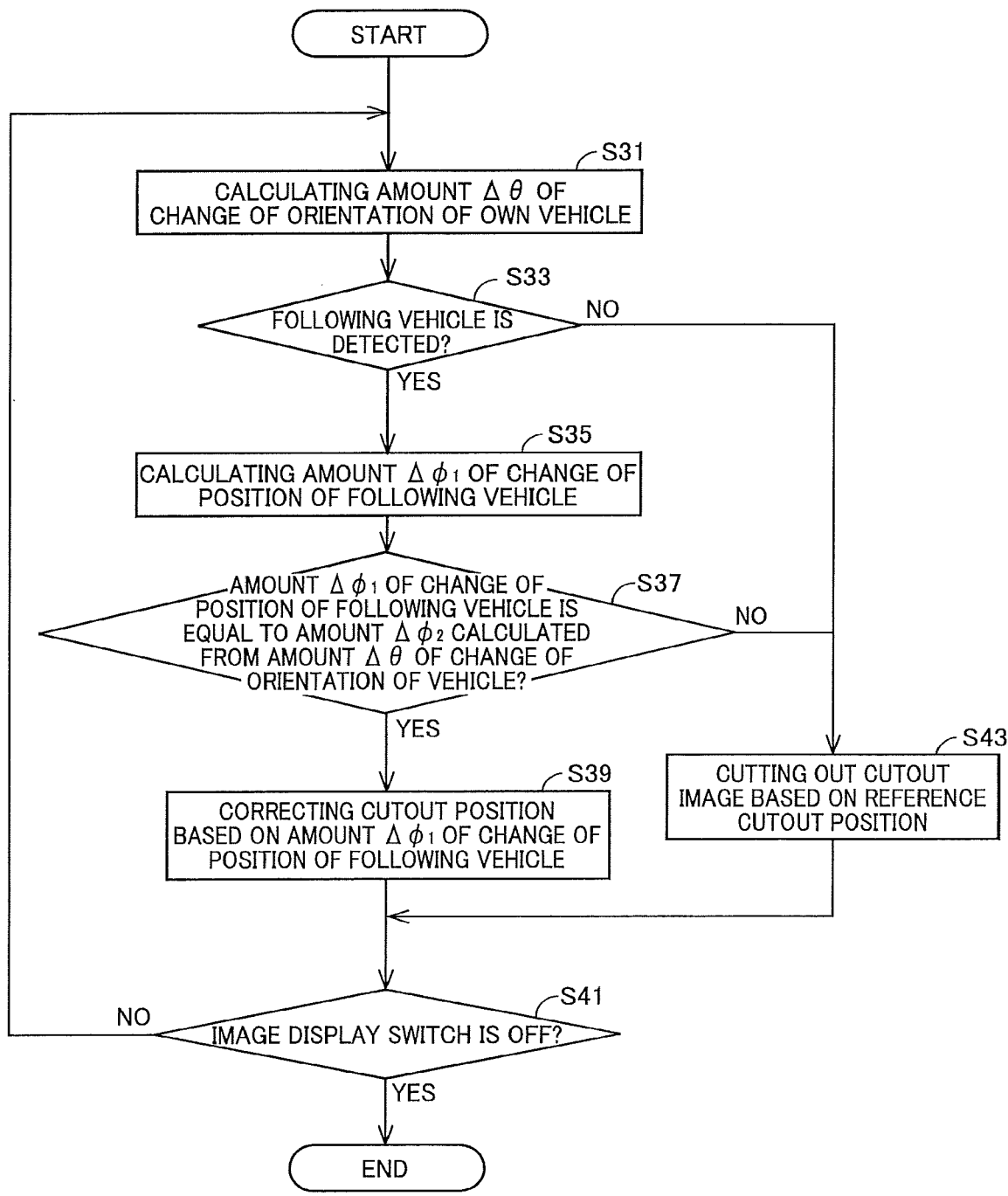
FIG. 9 is a flow chart illustrating an image cutout processing executed by the controller in a second modification of the first embodiment.

In the present modification, when the orientation of the own vehicle is changed, the controller 16 detects a change of the position of the following vehicle in the taken image and changes the cutout position. FIG. 9 illustrates a flow chart representing the image cutout processing executed by the controller 16. This flow begins when the image display switch 22 is turned to ON. From the timing just after the image cutout processing is started, the controller 16 obtains an image taken by the vehicle-mounted camera 18 each time when a predetermined length of time is elapsed and stores the taken image in the RAM for a specific length of time. It is noted that the taken images are stored in the RAM for the specific length of time and deleted in the order in which the images are taken.

This flow begins with S31 at which the controller 16 obtains the amount $\Delta\theta$ of change of the orientation of the own vehicle as in the processing at S3 in the first embodiment. As in the processing at S5, the controller 16 at S33 determines whether the following vehicle is detected in the image taken by the vehicle-mounted camera 18. When the following vehicle is detected in the taken image, this flow goes to S35. When the following vehicle is not detected, this flow goes to S43.

As in the processing at S7, the controller 16 at S35 calculates the amount $\Delta\varphi_1$ of change of the position of the following vehicle. The controller 16 at S37 converts the amount $\Delta\theta$ of change of the orientation of the own vehicle which is calculated at S31, to the amount $\Delta\varphi_2$ of change of the position in the taken image. The controller 16 then determines whether the amounts $\Delta\varphi_1$, $\Delta\varphi_2$ are equal to each other. This determination can be executed based on whether the difference between the amounts $\Delta\varphi_1$, $\Delta\varphi_2$ is less than or equal to the threshold value. With this processing, it is possible to determine whether the change of the position of the following vehicle in the taken image is caused by the change of the orientation of the own vehicle.

When the difference between the amounts $\Delta\varphi_1$, $\Delta\varphi_2$ is less than or equal to a set value, the amounts $\Delta\varphi_1$, $\Delta\varphi_2$ are equal to each other, and it is determined that the change of the position of the following vehicle in the taken image is caused by the change of the orientation of the own vehicle, and this flow goes to S39. When the difference between the amounts $\Delta\varphi_1$, $\Delta\varphi_2$ is greater than the set value, the amounts $\Delta\varphi_1$, $\Delta\varphi_2$ are not equal to each other, and the change of the position of the following vehicle in the taken image is not caused by the change of the orientation of the own vehicle, that is, there is a possibility that the change of the position of the following vehicle in the taken image is caused by, e.g., movement of the following vehicle in a direction parallel with the widthwise direction of the vehicle. Thus, this flow goes to S41. The controller 16 at S39 sets the amount $\Delta\varphi_1$ calculated at S35, to the distance L of movement of the cutout position in the taken image and moves the cutout frame from the reference cutout position by the moving distance L.

The direction in which the cutout frame is to be moved is determined based on whether the value of the rudder angle of the own vehicle which is obtained at S31 is positive or negative. The controller 16 then cuts out the cutout image based on the moved cutout frame, creates an image to be displayed by flipping the cutout image relative to the X-axis direction, and sends the display 20 a signal based on the image to be displayed. The controller 16 at S41 determines whether the signal output from the image display switch 22 is the OFF signal. When the signal output from the image display switch 22 is the OFF signal, this flow ends. When the signal output from the image display switch 22 is not the OFF signal, this flow returns to S31. When a negative decision (NO) is made at S33, this flow goes to S43 at which the controller 16 cuts out the cutout image based on the reference cutout position, creates an image to be displayed by flipping the cutout image relative to the X-axis direction, and sends the display 20 a signal based on the image to be displayed. Upon completion of the processing at S43, this flow goes to S41.

In the present embodiment as described above, even when the following vehicle in the cutout image is moved in the taken image due to a change of the orientation of the vehicle 2, the cutout position for the cutout frame is changed based on the change of the orientation of the vehicle 2, whereby the following vehicle moved in the taken image is located in the cutout frame. This reduces movement of the following vehicle in the image displayed on the display 20 due to the change of the orientation of the vehicle 2. Also, the processing at S37 is executed, and the cutout position for the cutout frame is changed when the position of the following vehicle in the taken image has changed due to a change of the orientation of the own vehicle, thereby reducing change of the position of the following vehicle in the cutout image due to the change of the orientation of the own vehicle. When a following vehicle exists at a rear of the own vehicle, the controller 16 moves the cutout frame, enabling appropriate display of the following vehicle on the display 20.

In the first embodiment, the first modification, and the second modification, each of the taken images $A_1$-$A_7$ is one example of a first image, and each of the cutout images $b_1$-$b_7$ and $B_3$ and $B_7$ is one example of a second image. The controller 16 which executes the processings at S3, S11, and S15 in FIG. 6, S21 and S23 in FIG. 8, and S31 and S39 in FIG. 9 is one example of an image cutouter. The amount $\Delta\theta$ of change of the orientation of the vehicle 2 is one example of each of a first change amount and a second change amount. The amount $\Delta\varphi_2$ of change of the position of the following vehicle in the taken image is one example of a position change amount. Each of the vehicle positions $P_3$, $P_5$ is one example of a first time point. Each of the vehicle positions $P_2$, $P_4$ is one example of a second time point. The length of time required for movement of the own vehicle from the vehicle position $P_2$ to the vehicle position $P_3$ or from the vehicle position $P_4$ to the vehicle position $P_5$ is one example of the first period.

While the embodiment has been described above, it is to be understood that the disclosure is not limited to the details of the illustrated embodiment, but may be embodied with various changes and modifications, which may occur to those skilled in the art, without departing from the spirit and scope of the disclosure. In the above-described embodiment and modifications, the controller 16 calculates values, including the amount $\Delta\varphi_1$ of change of the position of the following vehicle and the amount $\Delta\theta$ of change of the orientation of the own vehicle, and moves the cutout frame based on these values, but the present disclosure is not limited to this processing. The controller 16 may detect a state of the vehicle which relates to the change of the orientation of the vehicle and move the cutout frame based on the detected state. For example, the controller may obtain a steering angle of a steering wheel and move the cutout frame such that the amount of movement of the cutout frame is greater when the steering angle is large than when the steering angle is small.

Also, the image display device 4 may be configured such that a navigation device is used to detect whether the own vehicle is driving on a road (e.g., a curve) which may change the orientation of the vehicle, and when the controller detects that the own vehicle is driving on the road which may change the orientation of the vehicle, the controller moves the cutout frame. In the case where the magnitude of the amount of change of the orientation of the vehicle is obtainable based on road information output from the navigation device, the controller 16 may change the distance L of movement of the cutout frame based on the magnitude of the amount of change of the orientation of the vehicle. In the first embodiment, the controller 16 determines that the own vehicle 32 is driving on the curve 30, based on the values output from the wheel-turning amount sensor 12 and the wheel speed sensors 14. However, the present disclosure is not limited to this processing. For example, the controller 16 may determine that the own vehicle 32 is driving on the curve 30, based on a value output from a sensor, examples of which include: a lateral acceleration sensor configured to detect gravity acceleration in the lateral direction of the vehicle 2 (i.e., the widthwise direction of the vehicle); and a gyrosensor configured to detect a rotation angle velocity (an angular speed) about an axis extending in a vertical direction of the vehicle 2.

The controller 16 may determine the magnitude of the amount of change of the orientation of the own vehicle 32 based on values output from the lateral acceleration sensor and the gyrosensor and determine the amount of movement of the cutout frame based on the determined magnitude of the amount of change of the orientation of the own vehicle 32. In the above-described embodiment, the cutout frame $Y_3$ is moved when the own vehicle 32 is driving on the curve 30. However, the cutout frame $Y_3$ may be moved when the own vehicle 32 is driving on a road other than the curve 30. For example, the cutout frame $Y_3$ may be moved when the own vehicle 32 is driving on a road on which the orientation of the own vehicle 32 is changed during driving, such as a crank road bent substantially perpendicularly and an S-shaped road bent in an S shape.

What is claimed is:

1. An image display device, comprising:
   a camera mounted on a vehicle and configured to take an image representing a view behind the vehicle;
   an image cutouter configured to cut out a second image as a cutout image that is cut out from a first image based on a cutout position representing a position of a portion of the first image in the first image, the first image being taken by the camera; and
   a display configured to display the second image cut out by the image cutouter,
   wherein the image cutouter is configured to change the cutout position for the second image in the first image based on a change of an orientation of the vehicle, and
   wherein the image cutouter is configured to change the cutout position for the second image in the first image when a following vehicle follows the vehicle and when a change of a position of the following vehicle in the first image is caused by a change of the orientation of the vehicle.

2. The image display device according to claim 1, wherein the image cutouter is configured to:
   detect a first change amount and a position change amount, the first change amount being an amount of change of the orientation of the vehicle in the first period, the position change amount being an amount of change of the position of the following vehicle in the first image in the first period; and
   compare the first change amount and the position change amount with each other to determine whether the change of the position of the following vehicle by the position change amount in the first period is caused by a change of the orientation of the vehicle in the first period.

3. The image display device according to claim 2, wherein the image cutouter is configured to change the cutout position for the second image in the first image based on the first change amount when the image cutouter determines that the change of the position of the following vehicle by the position change amount in the first period is caused by the change of the orientation of the vehicle in the first period.

4. The image display device according to claim 2, wherein the image cutouter is configured to change the cutout position for the second image in the first image based on the position change amount when the image cutouter determines that the change of the position of the following vehicle by the position change amount in the first period is caused by the change of the orientation of the vehicle in the first period.

5. An image display device, comprising:
   a camera mounted on a vehicle and configured to take an image representing a view behind the vehicle;
   an image cutouter configured to cut out a second image as a cutout image that is cut out from a first image based on a cutout position representing a position of a portion of the first image in the first image, the first image being taken by the camera; and
   a display configured to display the second image cut out by the image cutouter,
   wherein the image cutouter is configured to change the cutout position for the second image in the first image based on a change of an orientation of the vehicle, and wherein the image cutouter is configured to change the cutout position for the second image in the first image when a following vehicle following the vehicle is detected in the first image.

6. The image display device according to claim 5, wherein the image cutouter is configured to change the cutout position for the second image in the first image when the orientation of the vehicle is changed due to driving of the vehicle on a curve.

7. The image display device according to claim 6, wherein the image cutouter is configured to change the cutout position for the second image in the first image such that the cutout position is moved toward an inner side of the curve in the first image, when driving of the vehicle on the curve is detected.

8. The image display device according to claim 5, wherein the image cutouter is configured to change the cutout position for the second image in the first image based on a first change amount that is an amount of change of the orientation of the vehicle in a first period.

9. The image display device according to claim 8, wherein the image cutouter is configured to:
   calculate the first change amount; and
   change the cutout position for the second image in the first image such that the cutout image created when the amount of change of the orientation of the vehicle in the first period is the first change amount becomes the cutout image created when the amount of change of the orientation of the vehicle is equal to a second change amount that is less than the first change amount.

10. The image display device according to claim 9,
wherein the image cutouter is configured to change the cutout position from a reference cutout position based on a change of the orientation of the vehicle, and the reference cutout position is a reference position for the cutout image in the first image,
wherein the first period is a period whose endpoint is a first time point and whose starting point is a second time point that is earlier than the first time point, and
wherein the image cutouter is configured to change the cutout position for the second image in the first image such that the second image cut out from the first image at the first time point becomes the cutout image cut out at the reference cutout position that is a position at a time before a change of the cutout position for the second image in the first image at the second time point.

* * * * *